US008660862B2

(12) United States Patent
Patterson et al.

(10) Patent No.: US 8,660,862 B2
(45) Date of Patent: Feb. 25, 2014

(54) DETERMINATION OF HEALTHCARE COVERAGE USING A PAYMENT ACCOUNT

(75) Inventors: Barbara Elizabeth Patterson, South San Francisco, CA (US); Stacy Pourfallah, Oakland, CA (US); Janet Pruitt, Mill Valley, CA (US); Loc Nguyen, San Francisco, CA (US); Nigel Smith, Silver Spring, MD (US)

(73) Assignee: Visa U.S.A. Inc., San Francisco, CA (US)

( * ) Notice: Subject to any disclaimer, the term of this patent is extended or adjusted under 35 U.S.C. 154(b) by 1217 days.

(21) Appl. No.: 11/755,713

(22) Filed: May 30, 2007

(65) Prior Publication Data

US 2008/0010096 A1    Jan. 10, 2008

Related U.S. Application Data

(63) Continuation-in-part of application No. 11/230,743, filed on Sep. 20, 2005.

(60) Provisional application No. 60/914,629, filed on Apr. 27, 2007.

(51) Int. Cl.
*G06Q 40/00* (2012.01)

(52) U.S. Cl.
USPC .................................. 705/4; 705/35

(58) Field of Classification Search
USPC ........................................ 705/4, 35
See application file for complete search history.

(56) References Cited

U.S. PATENT DOCUMENTS

| 4,491,725 A | 1/1985 | Pritchard |
| 5,018,067 A | 5/1991 | Mohlenbrock et al. |
| 5,070,452 A | 12/1991 | Doyle, Jr. et al. |
| 5,175,416 A | 12/1992 | Mansvelt et al. |
| 5,235,507 A | 8/1993 | Sackler et al. |
| 5,301,105 A | 4/1994 | Cummings, Jr. |
| 5,324,077 A | 6/1994 | Kessler et al. |
| 5,335,278 A | 8/1994 | Matchett et al. |
| 5,550,734 A | 8/1996 | Tarter et al. |
| 5,628,530 A | 5/1997 | Thornton |
| 5,644,778 A * | 7/1997 | Burks et al. ...................... 705/2 |
| 5,710,578 A | 1/1998 | Beauregard et al. |

(Continued)

FOREIGN PATENT DOCUMENTS

| AU | 2006203957 | 3/2012 |
| AU | 2006203968 | 3/2012 |

(Continued)

OTHER PUBLICATIONS

Babcock, Charles; "New Claim Game"; Information Week; Feb. 9, 2004.*
Young, Mark; "Scripps health automates its claims forms processing"; Today; Feb. 1999.*
Companion Guide 835 Health Care Claim Payment/Advice, Convansys, Jun. 24, 2004 XP002564865 http://www.njelkids.com/UL/pdf/NJ_835v1_20040820-2.pdf.

(Continued)

*Primary Examiner* — Edward Chang
(74) *Attorney, Agent, or Firm* — Loeb & Loeb LLP

(57) ABSTRACT

Healthcare insurance coverage is determined using an account within a payment processing system. A transmission addressed to the payment processing system is formed including an account number of an account associated with the payment processing system, a description of a healthcare related commodity rendered to a patient deriving healthcare insurance through an insured, and request for a specification of financial responsibility of the insured for the described said healthcare related commodity. A transmission is received from the payment processing system including the requested specification of financial responsibility.

21 Claims, 14 Drawing Sheets

(56) References Cited

U.S. PATENT DOCUMENTS

| | | | |
|---|---|---|---|
| 5,832,447 | A | 11/1998 | Rieker et al. |
| 5,915,241 | A | 6/1999 | Giannini |
| 5,965,860 | A | 10/1999 | Oneda |
| 5,995,939 | A | 11/1999 | Berman et al. |
| 6,012,035 | A | 1/2000 | Freeman, Jr. et al. |
| 6,044,352 | A | 3/2000 | Deavers |
| 6,082,776 | A | 7/2000 | Feinberg |
| 6,112,183 | A | 8/2000 | Swanson et al. |
| 6,151,588 | A | 11/2000 | Tozzoli et al. |
| 6,208,973 | B1 | 3/2001 | Boyer et al. |
| 6,332,133 | B1 | 12/2001 | Takayama |
| 6,343,271 | B1 | 1/2002 | Peterson et al. |
| 6,401,079 | B1 | 6/2002 | Kahn et al. |
| 6,529,884 | B1 | 3/2003 | Jakobsson |
| 6,629,081 | B1 | 9/2003 | Cornelius et al. |
| 6,850,901 | B1 | 2/2005 | Hunter et al. |
| 6,877,655 | B1 | 4/2005 | Robertson et al. |
| 6,915,265 | B1 | 7/2005 | Johnson |
| 6,988,075 | B1 | 1/2006 | Hacker |
| 7,072,842 | B2 | 7/2006 | Provost et al. |
| 7,174,302 | B2 | 2/2007 | Patricelli et al. |
| 7,295,988 | B1 | 11/2007 | Reeves |
| 7,428,494 | B2 | 9/2008 | Hasan et al. |
| 7,650,308 | B2 | 1/2010 | Nguyen et al. |
| 7,752,096 | B2 | 7/2010 | Santalo et al. |
| 7,774,273 | B2 | 8/2010 | Neal et al. |
| 7,866,548 | B2 | 1/2011 | Reed et al. |
| 7,925,518 | B2 | 4/2011 | Lee et al. |
| 7,996,260 | B1 | 8/2011 | Cunningham et al. |
| 2001/0037295 | A1 | 11/2001 | Olsen |
| 2001/0053986 | A1* | 12/2001 | Dick ............................ 705/3 |
| 2002/0002534 | A1 | 1/2002 | Davis et al. |
| 2002/0002536 | A1 | 1/2002 | Braco |
| 2002/0019808 | A1 | 2/2002 | Sharma |
| 2002/0032583 | A1 | 3/2002 | Joao |
| 2002/0128863 | A1 | 9/2002 | Richmond |
| 2002/0138309 | A1 | 9/2002 | Thomas, Jr. |
| 2002/0147678 | A1 | 10/2002 | Drunsic |
| 2002/0152180 | A1 | 10/2002 | Turgeon |
| 2002/0198831 | A1 | 12/2002 | Patricelli et al. |
| 2003/0009355 | A1 | 1/2003 | Gupta |
| 2003/0040939 | A1 | 2/2003 | Tritch et al. |
| 2003/0055686 | A1 | 3/2003 | Satoh et al. |
| 2003/0193185 | A1 | 10/2003 | Valley et al. |
| 2003/0200118 | A1 | 10/2003 | Lee et al. |
| 2003/0212642 | A1 | 11/2003 | Weller et al. |
| 2003/0225693 | A1 | 12/2003 | Ballard et al. |
| 2004/0006490 | A1 | 1/2004 | Gingrich et al. |
| 2004/0039693 | A1 | 2/2004 | Nauman et al. |
| 2004/0054935 | A1 | 3/2004 | Holvey et al. |
| 2004/0103000 | A1 | 5/2004 | Owurowa et al. |
| 2004/0111345 | A1 | 6/2004 | Chuang et al. |
| 2004/0128201 | A1 | 7/2004 | Ofir et al. |
| 2004/0138999 | A1* | 7/2004 | Friedman et al. ............. 705/39 |
| 2004/0148203 | A1 | 7/2004 | Whitaker et al. |
| 2004/0172312 | A1* | 9/2004 | Selwanes et al. ............. 705/4 |
| 2004/0186746 | A1 | 9/2004 | Angst et al. |
| 2004/0210520 | A1 | 10/2004 | Fitzgerald et al. |
| 2004/0225567 | A1 | 11/2004 | Mitchell et al. |
| 2004/0254816 | A1 | 12/2004 | Myers |
| 2005/0010448 | A1 | 1/2005 | Mattera |
| 2005/0015280 | A1 | 1/2005 | Gabel et al. |
| 2005/0033609 | A1 | 2/2005 | Yang |
| 2005/0038675 | A1 | 2/2005 | Siekman et al. |
| 2005/0065819 | A1 | 3/2005 | Schultz |
| 2005/0065824 | A1 | 3/2005 | Kohan |
| 2005/0071194 | A1 | 3/2005 | Bormann et al. |
| 2005/0119918 | A1 | 6/2005 | Berliner |
| 2005/0182721 | A1 | 8/2005 | Weintraub |
| 2005/0187790 | A1 | 8/2005 | Lapsker |
| 2005/0187794 | A1 | 8/2005 | Kimak |
| 2005/0209893 | A1 | 9/2005 | Nahra et al. |
| 2005/0211764 | A1 | 9/2005 | Barcelou |
| 2005/0246292 | A1 | 11/2005 | Sarcanin |
| 2005/0273387 | A1 | 12/2005 | Previdi |
| 2005/0288964 | A1 | 12/2005 | Lutzen et al. |
| 2006/0010007 | A1 | 1/2006 | Denman et al. |
| 2006/0106645 | A1 | 5/2006 | Bergelson et al. |
| 2006/0106646 | A1 | 5/2006 | Squilla et al. |
| 2006/0111943 | A1 | 5/2006 | Wu |
| 2006/0129427 | A1 | 6/2006 | Wennberg |
| 2006/0129435 | A1 | 6/2006 | Smitherman et al. |
| 2006/0149529 | A1 | 7/2006 | Nguyen et al. |
| 2006/0149603 | A1 | 7/2006 | Patterson et al. |
| 2006/0149670 | A1 | 7/2006 | Nguyen et al. |
| 2006/0161456 | A1 | 7/2006 | Baker et al. |
| 2006/0173712 | A1 | 8/2006 | Joubert |
| 2006/0184455 | A1 | 8/2006 | Meyer et al. |
| 2006/0206361 | A1 | 9/2006 | Logan, Jr. |
| 2006/0224417 | A1 | 10/2006 | Werner |
| 2006/0229911 | A1 | 10/2006 | Gropper et al. |
| 2006/0235761 | A1 | 10/2006 | Johnson |
| 2007/0005403 | A1 | 1/2007 | Kennedy et al. |
| 2007/0027715 | A1 | 2/2007 | Gropper et al. |
| 2007/0061169 | A1 | 3/2007 | Lorsch |
| 2007/0143215 | A1 | 6/2007 | Willems |
| 2008/0010096 | A1 | 1/2008 | Patterson et al. |
| 2008/0071646 | A1 | 3/2008 | Hodson et al. |
| 2011/0178816 | A1 | 7/2011 | Lee et al. |

FOREIGN PATENT DOCUMENTS

| | | |
|---|---|---|
| EP | 1834275 | 9/2007 |
| EP | 1834314 | 9/2007 |
| EP | 1856663 | 11/2007 |
| HK | 1107164 | 3/2008 |
| HK | 1107172 | 3/2008 |
| HK | 1108752 | 5/2008 |
| JP | 2005124991 | 5/2005 |
| JP | 2008545210 | 12/2008 |
| KR | 1020040028017 | 4/2004 |
| KR | 1020050099707 | 10/2005 |
| KR | 1020050094938 | 7/2006 |
| WO | WO99/22330 | 5/1999 |
| WO | WO01/06468 | 1/2001 |
| WO | WO03/073353 | 9/2003 |
| WO | WO2006/074285 | 7/2006 |

OTHER PUBLICATIONS

Hammond, W Edward and Cimino, James "Standards in Medical Informatics: Computer Applications in Health Care and Biomedicine," 2000 Springer, NY XP002564866, pp. 226-276.

Classen, David et al.; "The Patient safety Insitute demonstration Project: A Model for Implementing a Local Health information Infrastructure"; 2004, Journal of Healthcare Information Management, vol. 19, No. 4, pp. 75-86.

"Patient Safety Institute: Economic Value of a Community Clinical Information Sharing Network, Part 1: Value to Payers (Private, Medicare, Medicaid and self-Insured Employers) and the Uninsured"; White Paper prepared by Emerging Practives First consulting Group, 2004. pp. 1-18.

Supplementary European Search Report for EP 06717481.

Supplementary European Search Report for EP 06717470.

Supplementary European Search Report for EP 06717482.

Recal Introduces WebSentry Reducing the Risk of Fraud for Internet Transactions; WebSentry Offers System Integrators Cost Effective SET Compliance for E-Commerce—Canadian Corporation News May 26, 1999.

International Preliminary Report on Patentability completed on Oct. 11, 2011 corresponding to PCT/US07/84179.

International Search Report mailed on May 5, 2008 corresponding to PCT/US07/84179.

International Preliminary Report on Patentability issued on Sep. 25, 2007 corresponding to PCT/US06/000288.

International Search Report mailed on Aug. 31, 2007 corresponding to PCT/US06/000288.

IP AUSTRALiA, "Patent Examination Report No. 2", issued in corresponding AU Patent Application No. 2007352356, Issued Jan. 10, 2014, 4 pages.

* cited by examiner

Illustration of Model System: Before Service

Before Service
- Patient receives PSI Visa Bank X HSA card and is authenticated
- Patient logs on to secure website and sets privacy settings
  - Allows provider access to medical records
- Patient feels ill and logs on to secure website to research symptoms
- Uncertain, patient calls the PSI/Visa medical hotline for guidance. A list of 5-star providers in area are identified for further exploration/ treatment of hypothesized symptoms

Point of Care Pre-Treatment
- Patient presents PSI Visa Bank X HSA card upon arrival at doctor's office
- PSI Visa Bank X HSA card is swiped at computer terminal, and an eligibility response, co-payment confirmation, and basic medical record in received within 30 seconds
- Patient reviews medical records with doctor for accuracy and completeness
- Reason for visit is entered into patient's medical records

Figure 4

Illustration of Model System: Before Service

Point of Care Post-Treatment
- Doctor treats patient, taking into account patient's medical history and current medications
- PSI Visa Bank X card is again swiped at computer terminal, and actual treatment, referrals, follow-ups, and prescribed medications are uploaded to patient's medical records
- Doctor receives adjudicated claims information based upon contracted rates within 30 seconds. Doctor bills patient for remaining deductible
- Patient authorizes doctor to pay bill in-full with PSI Visa Bank X HSA card

After Service
- Patient goes to pharmacy and presents PSI Visa Bank X HSA card. Prescription is automatically accessed and filled. Patient makes co-payment with HSA balance
- Patient calls PSI/Visa medical hotline and complains of bad service at the doctor's office. Patient input is incorporated into the doctor's ratings, resulting in the doctor being re-rated as a 4.5-Star provider
- Visa facilitates the claims payment from the payer to the doctor. Account reconciliation information is provided through the PSI portal
- EOB information is made available to the consumer through the PSI portal

Figure 5

Key Components of Model System 

*Strawman for Discussion*

Real-Time Access to Information
- Provider:
  -- Eligibility
  -- Adjudicated Claims
  -- Medical Records
- Carrier: Administered treatments and results

Greater Efficiency in Payments
- Payer-to-provider claims payments/ accelerated payments
- Consumer-to-provider co-payments and deductibles

Risk Management
- Provider:
  -- One vs. multiple portals
  -- Benefits of security and fraud controls of Visanet system

Access to "Quality" Services
- Basic health information (portal)
- Provider ratings and supplemental information
- Concierge services
- Healthcare financial advice

Figure 6

Potential Roles 

| Potential PSI Role | Value Proposition |
|---|---|
| Real-time provision of patient's records | - Financial model based on relative stakeholder value<br>- Likely scalable model<br>- Will likely improve the delivery of healthcare in the USA |

| Potential Visa Role | Value Proposition |
|---|---|
| Real-time provision of eligibility information | - Millions of transactions<br>- Transaction processing fees |
| Real-time provision of adjudicated claims information | - Millions of transactions<br>- Transaction processing fees; possible stand-in-processing fees |
| Payer-to-provider claims payments | - Likely (high) thousands of transactions<br>- Transaction processing fees |
| Payer-to-provider accelerated claims payments | - Likely (high) thousands of transactions<br>- Fee for service |
| Provision of "quality" services | - Visa brand loyalty<br>- Possible fee for service |

Figure 7

DETERMINATION OF HEALTHCARE COVERAGE USING A PAYMENT ACCOUNT

CROSS-REFERENCES TO RELATED APPLICATIONS

This application is a continuation-in-part application of and claims priority to U.S. patent application Ser. No. 11/230,743, by Patterson, et al, filed Sep. 20, 2005, titled "Method and System for Determining Healthcare Eligibility", which is incorporated by reference in its entirety for all purposes. This application also claims priority to U.S. Provisional Application Ser. No. 60/914,629, by Nigel Smith, filed Apr. 27, 2007, titled "Patient-Carrier-Provider (PCP) Potential Solution Design."

BACKGROUND

Insurance companies typically provide their customers with health identification (ID) cards, which contain information such as patient name, employer plan number, type of insurance coverage, and applicable co-pay amounts. These ID cards are useful to healthcare providers such as doctors.

While ID cards are useful, they do not convey information regarding the current status of insurance coverage. For example, the cardholder may no longer be employed by the company that originally provided insurance coverage, so that the cardholder's insurance coverage may no longer be valid. To deal with this issue, healthcare providers use different means to check the current eligibility status of patients.

Some providers fax and/or make telephone calls to a customer service center operated by the cardholder's insurance carrier to determine if the cardholder is eligible for a particular type of healthcare service. Such methods, however, can be time consuming for the provider's office staff and are expensive for insurance carriers.

Some companies (e.g., SpotCheck and ProxyMed) have developed electronic eligibility verification systems using point-of-sale (POS) terminals. The POS terminals require either a dedicated POS terminal or separate connections to the eligibility service provider. Such systems require the use of specialized POS terminals and specialized connections between the service provider and the carrier. Since specialized equipment is required, widespread acceptance of such systems has not been achieved.

Some companies (e.g., United Health Group and MasterCard) have developed electronic eligibility verification using a POS terminal and a payment authorization transaction over an existing payment network, where the transaction amount is used to equate to a particular service type (e.g., $0.01 is an office visit). This approach has created problems for the provider's office and the provider's financial institution, because these transactions are indistinguishable from a true payment transaction and can be inadvertently processed as real payment transactions.

Some healthcare clearing houses (e.g.; WebMD) and insurance companies have developed Internet-based systems to permit provider offices to access eligibility information electronically, but this typically requires relatively expensive PC equipment and PC-trained office staff. As noted above, if specialized equipment is required, widespread acceptance is unlikely.

Moreover, the flow of payments and information between healthcare providers and insurance carriers has traditionally been inefficient and substantially error-prone because of structural and other factors, and many opportunities exist for optimization. Another challenge lies in latency of the patient payment collection process. Providers typically do not bill patients until submitted claims have been processed and adjudicated by the patient's insurance carrier—a process which may take several weeks to complete. As a result, an average of 42% of total provider revenue may be tied-up in accounts receivables, of which a significant share may exceed one hundred and twenty (120) days. This is expected to exacerbate over the next few years with the drive toward consumer driven health plans.

The patient collection process may be conducted electronically; however, industry standards may confine both the format and the content of electronic transmissions containing healthcare related information. The United States' Health Insurance Portability and Accountability Act (HIPAA) is an example of a standard in the industry that may govern the form of electronic transmissions dealing with health care information. The primary goal of HIPAA is to simplify and enhance electronic data interchange (EDI) between providers and insurance carriers, and thereby drive efficiencies in their overall dialogue. To protect the privacy rights of patients, HIPAA also defines rules to ensure that all medical records, medical billing, and patient accounts meet certain consistent standards with regard to documentation, handling and privacy. Any healthcare provider that electronically stores, processes or transmits medical records is required to be fully HIPAA compliant as of April 2006.

It would be useful to develop solutions that can facilitate an electronic dialogue between healthcare providers and insurance carriers based on HIPAA standards. It would also be useful if the solutions take into consideration scalability and interoperability.

Scalability Considerations

Insurance carriers and healthcare providers differ fundamentally in levels of consolidation.

There are ~800,000 physicians in the USA, most of which work in small practice groups (less than 4 MDs), and ~5,800 registered hospitals.

Although the number of insurance carriers approximate 20,000, the top 20 cover 70% of all U.S. enrollees.

Collectively, these entities account for an estimated 2 billion eligibility transactions and 900 million claims transactions each year.

SUMMARY

Implementations are directed to facilitating communication in a healthcare environment. One implementation is directed to a method comprising: receiving patient information at a POS terminal operated by a healthcare provider; creating a non-financial authorization request message which relates to healthcare using payment card and patient information; sending the authorization request message to an acquirer processor, wherein the acquirer processor sends the authorization request message to a transaction processing system such as a payment processing system, and wherein the authorization request message is evaluated (e.g., by an insurance carrier) in view of information from a healthcare processor; and receiving a response message in response to the authorization request message.

Another implementation is directed to a computer readable medium comprising: code for receiving patient information at a terminal operated by a healthcare provider; code for creating a non-financial authorization request message which relates to healthcare using the patient information; code for sending the authorization request message to an acquirer processor, wherein the acquirer processor sends the authorization request message to a transaction processing system, and wherein the authorization request message is evaluated (e.g., by an insurance carrier) in view of information from a healthcare processor or an issuer processor; and code for receiving a response message in response to the authorization request message.

Another implementation is directed to a method comprising: receiving patient information comprising a patient identification number at a terminal operated by a healthcare provider, wherein the patient information is stored in a portable consumer device in the form of a card; creating a non-financial authorization request message, which relates to healthcare using the patient information, wherein creating the authorization request message comprises adding data to a data field to indicate that the authorization request message relates to a non-financial transaction; sending the authorization request message to an acquirer processor, wherein the acquirer processor sends the authorization request message to a transaction processing system, an issuer processor, and (optionally) then a healthcare processor; and receiving a response message from the healthcare processor, via the issuer processor, the transaction processing system, and the acquirer processor.

In another implementation, a transmission addressed to a payment processing system is formed. The transmission can include an identifier of an account, associated with an insured, within the payment processing system (e.g., a Flexible Spending Account); a description of a healthcare related commodity (e.g., a good and/or service) for rendering to the patient deriving healthcare insurance through the insured; and a request for a specification of financial responsibility of the insured for the described said healthcare related commodity (e.g., inquiry for data regarding the patient's insurance coverage eligibility and/or the monetary responsibility value of the insured for healthcare related commodity rendered to a patient). A healthcare provider, such as a doctor or a pharmacy, may render the healthcare related commodity. A response to the request may be received from the addressed payment processing system. The reply may include the requested specification of financial responsibility.

In another implementation, a first transmission addressed to a payment processing system is received, the first transmission including: an identifier of an account, associated with an insured, within the payment processing system; a description of a healthcare related commodity for rendering to a patient deriving healthcare insurance through the insured; and a request for a specification of financial responsibility of the insured for the described said healthcare related commodity. An insurance account identifier is determined and is based at least in part on the identifier of the account, wherein the insurance account identifier is associated with both the insured and the insurance carrier of the insured. A second transmission addressed to the insurance carrier is formed. The second transmission may include the insurance account identifier; the description of the healthcare related commodity; and the request for the specification of financial responsibility. A reply to the request from the addressed insurance carrier is received and can include the specification of financial responsibility. A third transmission addressed to the healthcare provider is formed, the third transmission including at least part of the reply.

In yet another embodiment, an amount is received in return for a submission of an account in a payment system associated with an insured. The submission makes a request for a healthcare related commodity for rendering to a patient deriving healthcare insurance through the insured. The amount that is received is the amount that is owed by the insured for the healthcare related commodity for rendering to the patient. That is, the amount is owed for a good or service that has been or will be rendered to the patient.

BRIEF DESCRIPTION OF THE DRAWINGS

FIG. 4 depicts a table illustrating, for an exemplary model system, activities prior to the rendering of a healthcare related commodity to a patient and activities at a point of care terminal;

FIG. 5 depicts a table illustrating, for the exemplary model system of FIG. 4, exemplary activities at a point of care terminal and exemplary activities after the rendering of the healthcare related commodity to the patient;

FIG. 6 depicts a table illustrating exemplary key components of the exemplary model system of FIG. 4;

FIG. 7 depicts a table illustrating, for the exemplary model system of FIG. 4, corresponding value propositions each of an exemplary third party healthcare information processor role and an exemplary transaction processor role;

DETAILED DESCRIPTION

Figure 1:
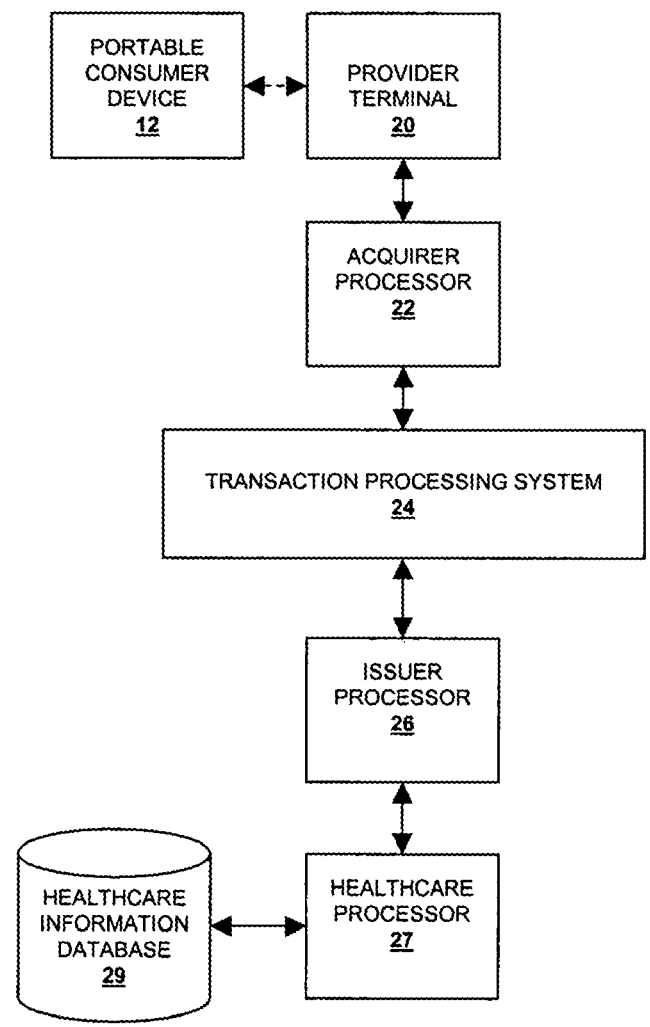
FIG. 1 shows a block diagram of an exemplary system for implementing a process for determining healthcare coverage using a payment account.

Implementations of the invention solve the problems of conventional health information systems by enabling healthcare providers to electronically check the eligibility status of patients via simple POS terminals connecting over existing payment system networks using an eligibility-specific information transaction, not a payment authorization transaction. Specialized equipment is not required in implementations of the invention, so widespread acceptance is much more likely than systems that require the use of specialized hardware and/or communications equipment.

Implementations of the invention send non-financial healthcare related messages through an existing financial network. Since the messages are not financial in nature, the acquirers, the providers and the insurance carriers will not confuse financial transaction messages passing through the network with the non-financial healthcare related messages. These and other advantages provided by implementations of the invention are apparent from the following descriptions of implementations of the invention. In implementations of the invention, a patient's eligibility to status regarding healthcare insurance coverage for healthcare related good or service is determined. The healthcare related good or service can be provided by a healthcare provider, and the eligibility determination is made by an adjudication entity such as an insurance carrier. Examples of healthcare providers include doctors, dentists, eye care specialists, hospitals, laboratories, stores that sell healthcare related goods, injury clinics, a chiropractor, an entity that having at least one of a good and a service that is covered by the insurance plan, a provider of a healthcare service for compensation by the healthcare insurance of the insured, a provider of healthcare goods for compensation by the healthcare insurance of the insured and a combination thereof.

Several types of eligibility responses are possible in implementations of the invention. These include a basic eligibility response, a basic eligibility with co-pay response, and an enhanced eligibility response. Each of these types of eligibility responses is described in further detail below.

Basic Eligibility Response: The basic eligibility response message includes information regarding whether the patient is eligible for healthcare coverage. For example, a basic eligibility response may simply be a "Yes/No" type of response.

Basic Eligibility with Co-Pay Response: The basic eligibility with co-pay response provides more information than the basic eligibility response. For example, in addition to a basic eligibility response message, the healthcare insurance carrier may provide information regarding a required co-pay amount. This helps to avoid problems when the patient does not remember or know the appropriate co-pay amount associated with the desired healthcare related good or service. In this case, both the eligibility status and co-pay amount are returned to the provider and/or the patient in a response message.

Enhanced Eligibility Response: An enhanced eligibility response may also have more information than the basic eligibility response. For example, to support new trends in consumer-driven healthcare, healthcare insurance carriers may provide additional information regarding the plan type, plan contracted service amount, family or individual coverage, deductibles, co-insurance, co-pay amounts, etc. Examples of enhanced eligibility responses are provided below.

In an illustrative implementation of the invention, a patient can swipe a payment card or health card at a healthcare provider's POS terminal. If a payment card is used, the card numbers are standard payment system card numbers issued in conformance with payment system standards.

The transaction can be formatted by or at the POS terminal using the acquirer's-defined transaction type format for information transactions. A processing code may be entered (manually or automatically) into the POS terminal to indicate that the transaction is a non-financial eligibility request transaction. The created authorization request message is then forwarded to the provider's acquirer processor, through an International Standards Organization (ISO) payment transaction system (e.g., Visanet), and to a designated issuer processor. The transmissions between the various entities in the system may be completed in HIPAA-compliant manner (Health Insurance Portability and Accountability Act of 1996), both in format of the message and security requirements.

The issuer, or its designated processor, identifies the transaction as a healthcare eligibility verification request. It then converts the patient's card number into the health insurance carrier's identification number for that individual. The issuer processor may then optionally forward the authorization request message (e.g., an eligibility authorization request message) to a healthcare processor.

The healthcare processor then determines if the patient is eligible or not for healthcare insurance coverage. The insurance carrier (or an entity designated by the insurance carrier) who operates the healthcare processor checks the current eligibility status for the individual's identification number and responds with a status of "Yes," currently eligible for healthcare insurance coverage or "No," not currently eligible. Alternatively, if there is a more complicated eligibility issue to be resolved, then the healthcare provider may be requested to contact the insurance carrier. Additional information, such as the co-pay amount, may also be included in a response message.

Once a response message is created, the healthcare or issuer processor transmits the response message including the eligibility determination back to the provider's POS terminal. The response message can be returned through the same path that the authorization request message (e.g., eligibility authorization request message) traveled, using appropriate message formats at each point in the process. Once the POS terminal receives the response message, the eligibility response information is then printed by the POS terminal and/or displayed at the POS terminal.

FIG. 1 shows a block diagram for a healthcare system according to an implementation of the invention. The system includes a provider terminal 20 that is operated by a healthcare provider. The terminal 20 may be a POS (point of sale) terminal like those that are presently available to interact with ordinary payment cards. In FIG. 1, one terminal 20 and one provider are described for simplicity of illustration. It is understood that there may be many more terminals and many more providers in implementations of the invention.

The terminal 20 may interact with portable consumer device 12. Examples of portable consumer devices include credit cards, debit cards, prepaid cards, healthcare insurance cards, smartcards, radio frequency identification (RFID) devices, driver's licenses, personal digital assistants, ATM cards, security badges, access badges, stored value cards, pagers, and the like. Interaction between the terminal 20 and the portable consumer device 12 can be facilitated using any suitable optical, magnetic, electromagnetic, or electronic mechanism. In some implementations, the portable consumer device 12 is in the form of a card and has a magnetic stripe.

The portable consumer device 12 may store or display information such as BINs (bank identification numbers), card account number, patient name, patient healthcare number, birth date, card expiration date, employer name, employer/group policy number, dependent names/numbers, co-payment amounts, etc.

The terminal 20 is in communication with an acquirer processor 22, which may be operated by an acquiring financial institution or by a third party processor on behalf of the acquiring financial institution. The acquiring financial institution may also process transactions for other merchants or sellers. The acquirer processor 22 is used to conduct ordinary financial transactions, and thus may be in communication with other merchants or sellers and processors.

The acquirer processor 22 communicates with an issuer processor 26 via a transaction processing system 24. The transaction processing system 24 can be primarily used for processing financial transactions. It can facilitate transactions that occur between the acquirer processor 22 and the issuer processor 26. The transaction processing system 24 can be operated by an organization such as a credit or debit card company.

The issuer processor 26 may be operated by an issuing financial institution such as a buyer bank, or another third party processor on behalf of the card issuer. A buyer (not shown) may interact with the issuer processor 26. The buyer may or may not be a healthcare consumer. In implementations of the invention, non-healthcare related buyers and sellers can use the same system as healthcare related buyers (e.g., patients) and sellers (e.g., service providers such as doctors).

The issuer processor 26 may further be in communication with a healthcare processor 27, which may be operated by an entity such as an insurance carrier or a third party processor that it designates. A healthcare database 29 may be in communication with the healthcare processor 27. The healthcare database 29 may store information such as patient information, provider information, insurance plan information, service code information, etc. Alternatively, the healthcare database may be operated by the issuer processor or a third party processor on behalf of the issuer.

The various processors shown in FIG. 1 (e.g., acquirer processor 22) may be embodied by any suitable combination of hardware and/or software. Typically, each processor includes at least a server computer. A server computer is a powerful computer or cluster of computers that behaves as a single computer which, services the requests of one or more client computers. The server computer can be a mainframe computer, a minicomputer, or a minicomputer cluster. For example, the server computer may include one or more database servers and one or more Web servers. Software for performing any of the functions of the processors (or any of the functions described herein) may be embodied by computer code stored on a computer readable medium, which may store data using suitable electrical, electroptical, optical, or magnetic data storage mechanism. The computer code may be written in any suitable programming language including C, C++, Pascal, etc.

Also, the system shown in FIG. 1 may be implemented using existing private networks or specialized communication networks (e.g., the Internet). The communication links may also include wired or wireless links.

More specific methods according to an implementation of the invention may be described with reference to FIG. 2, while also referring to FIG. 1.

First, patient identification information is received at a provider terminal 20 (step 30(*a*)). In some implementations, the patient may use a portable consumer device 12 to provide patient identification information or other information to the provider terminal 20. For example, the POS terminal transaction is originated like any other payment card transaction. The patient may have a payment (credit, debit or prepaid/stored value) or healthcare card with a magnetic stripe. The magnetic striped card is swiped through a card reader in the provider's terminal 20. Examples of patient identification information include credit, debit, or prepaid/stored value card numbers, health identification numbers, birth date, dependent names/numbers, social security numbers, drivers license numbers, etc.

Before or after the patient identification information is provided to the provider terminal 20, the provider (or the patient) may provide healthcare service information to the terminal 20. A processing code may be entered (manually or automatically) into the POS terminal to indicate that the transaction is a non-financial eligibility transaction. For example, a processing code for a healthcare related, non-financial message might be indicated as "39" (or any other code), while a processing code for purchasing a good or service might be indicated by the code "00".

In another example, service codes can be entered into the terminal 20. For example, provider staff can follow specified procedures, including entry of the healthcare-defined service type codes. These codes may be entered into the terminal 20 manually (e.g., by using input keys) or may be entered automatically. In other implementations, instead or in addition to healthcare services, healthcare goods information (e.g., SKU numbers) may be input into the terminal 20.

There are a number of healthcare service codes. Some examples are as follows:

| Service Code | Definition |
| --- | --- |
| 1 | Medical Care |
| 2 | Surgical |
| 50 | Hospital - Outpatient |
| 68 | Well Baby Care |
| 86 | Emergency Services |
| 98 | Physician Office Visit |
| A1 | Physician Visit - Nursing Home |
| AL | Vision (Optometry) |

After the patient information and the healthcare information are entered into and received by the terminal 20, an authorization request message (e.g., an eligibility authorization request message) may then be formatted at the terminal 20 (step 30(*c*)). The authorization request message may be formatted in a format specified by the acquirer or as an International Standards Organization (ISO) type, non-financial, information message. In some cases, the authorization request message may be an ISO 8583 type message, such as a standard (VisaNet) authorization request message. Information that may be included in the authorization request message is shown in the following table.

| Data Element | Description | Length |
| --- | --- | --- |
| Card Number | The card number assigned by the issuing financial. | 16 (Numeric) |
| Healthcare Provider ID | The medical license number of provider. | 9 (Numeric) |
| Service Type Code | A healthcare-defined standard code for healthcare treatment. | 5 (Alpha-numeric) |

In some implementations, data such as eligibility data associated with the patient may be added to a discretionary data field in the authorization request message. A discretionary data field is a field that can contain any particular information desired, for example, by an issuer. Additionally, discretionary data fields may be present in various data "tracks" that are present in many commercial credit and debit cards. Such data formats are defined by ANSI (American National Standards Institute).

Once formatted, the authorization request message may then be transmitted from the terminal 20 to the acquirer processor 22 (step 30(*d*)). The acquirer processor 22 then forwards the authorization request message to the transaction processing system 24 (e.g., VisaNet) (or "TPS") (step 30(*e*)).

The transaction processing system 24 (e.g., VisaNet) then forwards the authorization request message to the designated issuer processor 26 (step 30(*f*)). A bank identification number (BIN), which is the first six digits of the card number, may be used to facilitate routing to the issuer, or its designated processor 26.

After receiving the authorization request message associated with the specified BIN, the issuer processor 26 uses a number of data fields to identify an eligibility request (processing code and BIN) and converts the card number (e.g., a payment card number) to the insurance carrier's identification number for that patient (step 30(*g*)). The re-formatted message is then forwarded to the healthcare processor 27 (step 30(*h*)), which may be operated by an issuer processor or an insurance carrier, other payor, or other designated third party processor. The message format between the issuer processor 26 and healthcare processor 29 can be any mutually agreed format.

The authorization request message is evaluated in view of information from the healthcare processor 27. In other words, the eligibility determination can be made by the healthcare processor 27 or with information that is provided by the healthcare processor 27. For example, after receiving the authorization request message associated with the patient's identification number, the healthcare processor 27 checks the current eligibility status for the patient (step 30(*i*)). Patient data may be stored in the healthcare information database 29 and the healthcare processor 27 may contact the healthcare database 29 to determine if the patient is eligible for the requested healthcare-related good or service. The healthcare processor 27 then generates and sends a "yes" or "no" response back to the terminal 20, patient and provider. If approved and if applicable, the healthcare processor 27 also forwards the required co-pay for that service type code for the patient's plan coverage. More specific descriptions of eligibility determination processes performed by the healthcare processor 27 are provided below.

Any suitable response message format may be used. For example, the data to be transmitted from the healthcare processor 27 back to the terminal 20 may be formatted in a standard ISO type authorization response at some point in the process. An exemplary authorization response may include the following:

| Data Element | Description | Length |
| --- | --- | --- |
| Card Number | The card number assigned by the issuing financial institution. | 16 (Numeric) |
| Healthcare Provider ID | A medical license number of provider. | 9 (Numeric) |
| Service Type Code | A healthcare-defined standard code for healthcare treatment. | 5 (Alpha-numeric) |
| Carrier ID | An identification number that identifies the health insurance carrier or payer. | 6 (Numeric) |
| Approval or Reject Reason Code | Healthcare-defined codes for approvals and rejections of eligibility inquiries (see below). | 2 (Alpha-Numeric) |
| Co-Pay Amount | The amount of the co-pay, if applicable. | 10 (Numeric) |
| Carrier Comments | Carrier defined comments or information. | Up to 200 (Alpha-numeric) |

There are a number of healthcare-defined codes for rejected requests. Some examples are as follows.

| Reject Code | Definition |
| --- | --- |
| 15 | Required application data missing |
| 42 | Unable to respond at current time |
| 43 | Invalid/Missing provider identification |
| 52 | Service dates not within provider plan environment |
| 67 | Patient not found |

The response message may be sent from the issuer processor 26 to the terminal 20 along the path through which the authorization request message was transmitted. For example, the healthcare processor 27 sends the response message to the issuer processor 26 (step 30(*j*)). Upon receiving the response message, the issuer processor 26 converts the insurance carrier's identification number back to the patient's card number (e.g., payment card number) and maps the approval code and co-pay amounts into the designated fields of the authorization response message (step 30(*k*)). The authorization response message is then sent to the transaction processing system 24 (step 30(*l*)), and the transaction processing system 24 sends the authorization request message to the acquirer processor 22 (step 30(*m*)). The acquirer processor 22 then sends the response message to the originating terminal 20 (step 30(*n*)).

After the request message is received at the terminal 20, the terminal 20 may display or print out the response message. If the response indicates an approval, the terminal 20 may print a receipt that shows the co-pay information and any additional text returned by the healthcare processor 27. If the eligibility status cannot be confirmed, a decline response will be displayed on the receipt and additional manual verification procedures may be needed.

Figure 2:
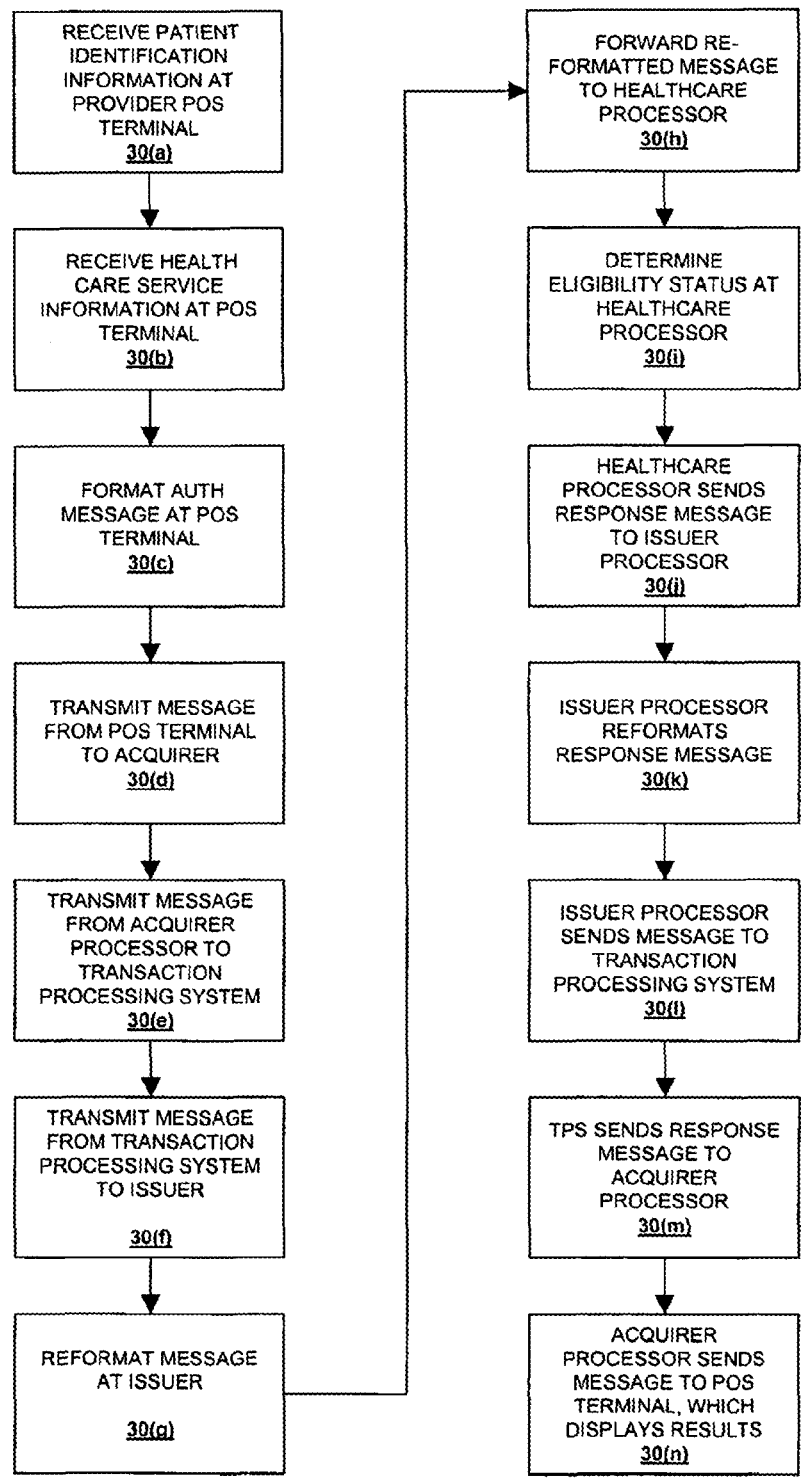
FIG. 2 shows a flowchart for an exemplary process for determining healthcare coverage using a payment account which can be implemented in the exemplary system of FIG. 1.

Implementations of the invention are not limited to the steps shown in FIG. 2. For example, the eligibility determination need not be performed by the healthcare processor 27. In other implementations, carrier and patient information can be sent from the healthcare processor 27 to the issuer processor 26, the transaction processing system 24, and/or the acquirer processor 22. The issuer processor 26, the transaction processing system 24, and/or the acquirer processor 22 could then make the eligibility determination based on information received from the healthcare processor 27.

Exemplary Eligibility Determination Processes

Figures 3A, 3B:
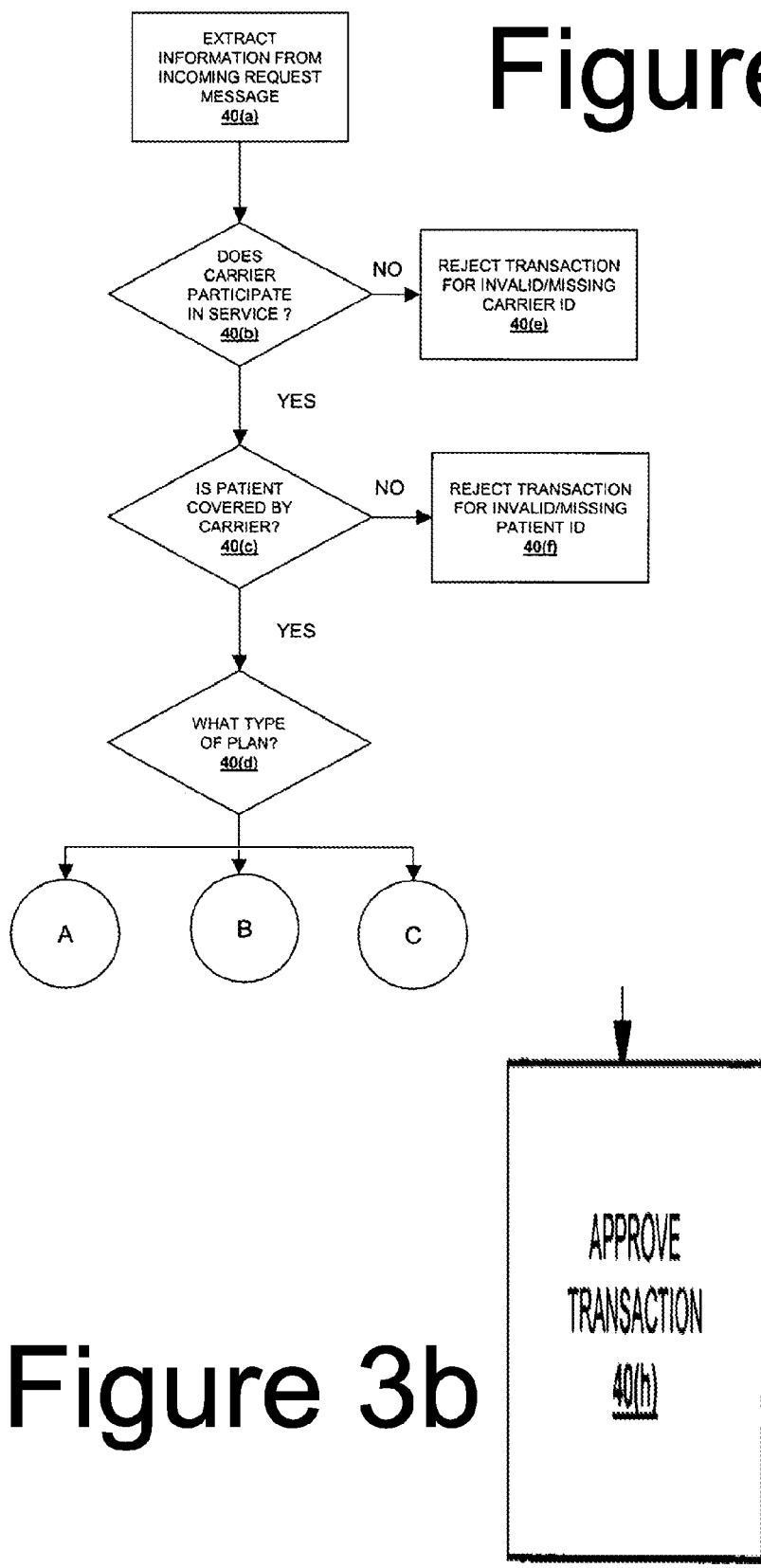
FIGS. 3(a)-3(d) show flowcharts illustrating respective exemplary processes of or relating to a determination of healthcare coverage using a payment account which can be implemented in the exemplary system of FIG. 1.
Figure 3C:
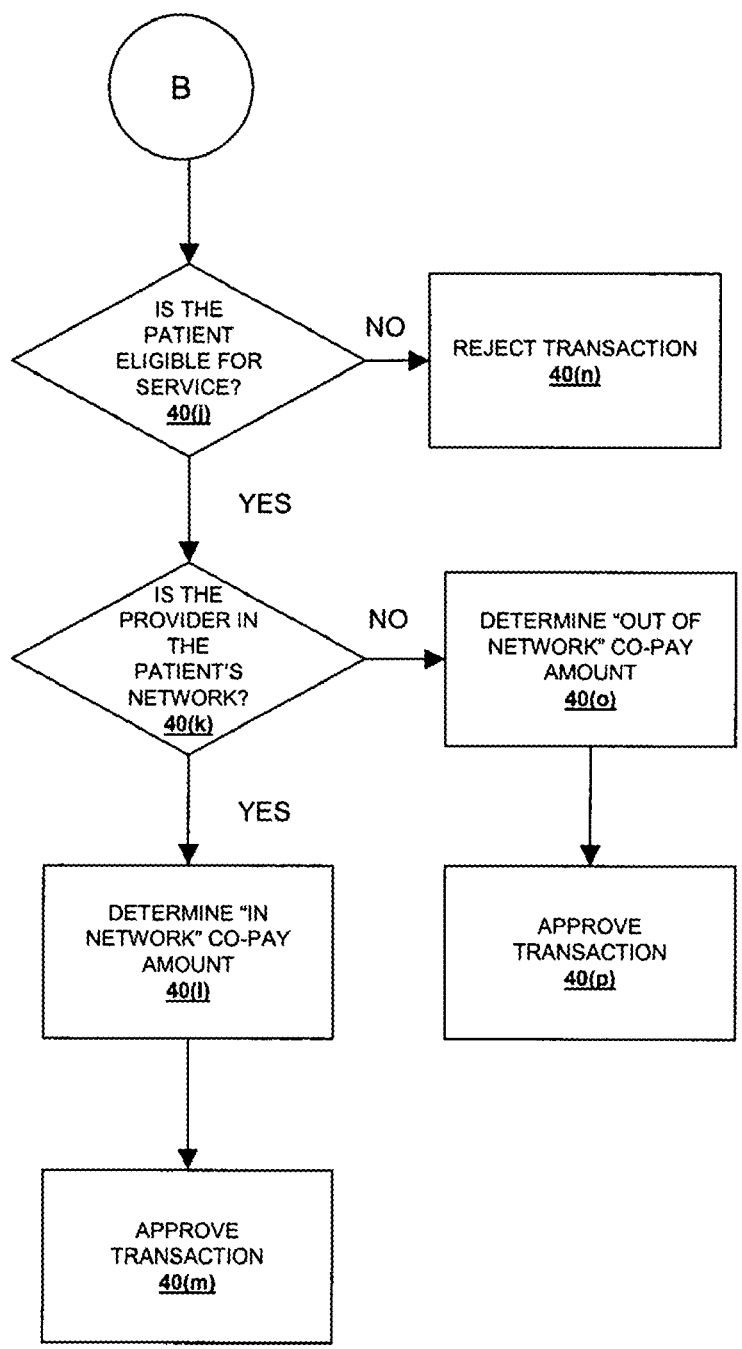
Figure 3D:
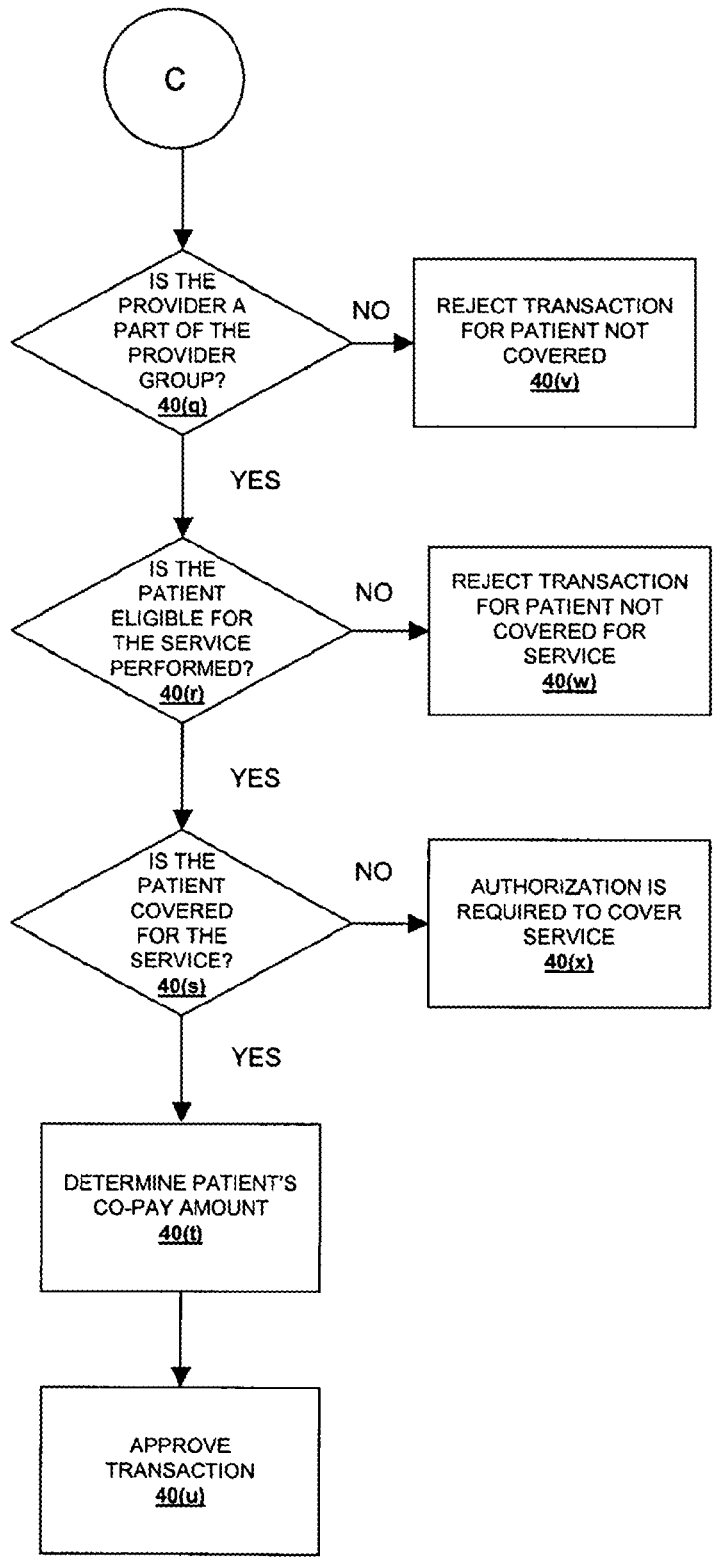

The examples described above illustrate methods that employ basic eligibility determinations. FIGS. 3(*a*) to 3(*d*) show a flowchart illustrating steps in a more complicated eligibility determination process that can be performed by the healthcare processor 27 (or other entity).

Referring to FIG. 3(*a*), the healthcare processor 27 extracts patient identification information from the authorization request message (step 40(*a*)), and then determines whether or not the carrier participates (step 40(*b*)). The patient identification information in the authorization request message is compared to patient identification data in the healthcare information database 29. As shown at decision step 40(*c*), if the patient identification information is matched to appropriate information in the healthcare database 29, then the transaction proceeds to the next step 40(*c*). As shown at step 40(*e*), if the patient information cannot be matched to information in the healthcare database 29, then the transaction is rejected. A response message with a reject reason code (e.g., "code 90: invalid/missing payor ID") is created by the healthcare processor 27.

If the healthcare processor 27 determines that the patient is covered by the insurance carrier, then the healthcare processor 27 determines what type of plan covers the patient (step 40(*d*)). If the patient has an indemnity plan type, then the process proceeds to the indemnity insurance plan subroutine A. If the patient has a POS (point of service) plan type, then the process proceeds to the POS insurance plan subroutine B. If the patient has an HMO or PPO plan type, then the process proceeds to the HMO/PPO insurance plan subroutine C.

FIG. 3(*b*) shows a subroutine that is applicable if the patient is covered under an indemnity insurance plan. First, the healthcare processor 27 determines if the patient is eligible for service (step 40(*g*)). If the patient is not covered, then the transaction is rejected by the healthcare processor 27. If the patient is covered, the healthcare processor 27 approves of the transaction (step 40(*h*)).

FIG. 3(*c*) shows a subroutine that is applicable if the patient is covered under a POS insurance plan. The healthcare processor 27 determines if the patient is eligible for the healthcare related good or service (step 40(*j*)). If the patient is not eligible, the transaction is rejected (step 40(*n*)). If the patient is eligible, then the healthcare processor 27 determines if the provider is in the patient's network (step 40(*k*)). If the patient is not eligible, then the healthcare processor 27 determines an "out of network" co-pay amount (step 40(*o*)), and the transaction is approved (step 40(*p*)). If the provider is in the patient's network, then the "in network" co-pay amount is determined (step 40(*l*)), and the transaction is approved (step 40(*m*)).

FIG. 3(*d*) shows a subroutine that is applicable if the patient is covered under an HMO or PPO plan type. First, the healthcare processor 27 determines if the provider is part of the provider group (step 40(*q*)). If the provider is not part of the HMO/PPO provider group, then the transaction is rejected and a message indicating that the patient is not covered is sent from the healthcare processor 27 back to the provider's terminal 20.

If the provider is part of the provider group, then the healthcare processor 27 determines if the patient is eligible for the service performed (step 40(*r*)). If not, then the transaction is rejected and a message indicating that the patient is not covered is sent from the healthcare processor 27 back to the provider's terminal 20.

If the patient is eligible for the healthcare related good or service, then the healthcare processor 27 determines if the patient is covered by the service (step 40(*s*)). If not, then the healthcare processor 27 seeks authorization to cover the service (step 40(*x*)). If the patient is eligible, then the patient's co-pay amount is determined and the transaction is approved (step 40(*u*)).

Enhanced Eligibility Transactions

The specific implementations described above refer to transactions where the eligibility of the patient is determined. Other implementations of the invention can be used for "enhanced eligibility transactions". There is a growing trend in the delivery of healthcare for individuals to assume a greater role for the payment of services. It is thought that consumers will exercise greater care, and be more cost conscious, in the purchase of healthcare services if they are responsible for directly paying for a greater proportion of their healthcare expenditures. This trend is referred to as consumer-driven or consumer-directed health care (CDHC). The advent of Health Savings Account (HSA) in December 2003 to complement high deductible health plans was a major step in the direction of CDHC. With high deductible health plans, individuals have much more discretion, and a greater stake, in the cost of healthcare services—as they will be paying 100% of the expenses up to the deductible amount of their health plan.

Health Savings Accounts offered individuals covered by high deductible health plans an opportunity to save on a tax-advantaged (applies to federal income taxes and may or may not apply to state income taxes) an amount up to the deductible of the health plan.

With this in mind, the healthcare provider potentially faces a more complicated situation in knowing how much to collect from the patient at the time of the visit. To give providers more information, the following data elements may be added in the authorization response message:

| Data Element | Description | Length |
| --- | --- | --- |
| Card Number | The card number assigned by the issuing financial institution | 16 (Numeric) |
| Healthcare Provider ID | The medical license number of provider. | 9 (Numeric) |
| Service Type Code | A healthcare-defined standard code for healthcare treatment. | 5 (Alpha-numeric) |
| Carrier ID | An identification number that identifies the health insurance carrier. | 6 (Numeric) |
| Approval or Reject Reason Code | Healthcare-defined codes for approval and declines of eligibility inquiries. | 6 (Numeric) |
| Co-Pay Amount | The amount of the co-pay, if applicable. | 10 (Numeric) |
| Insurance Type Code | A code identifying the type of insurance policy within a specific insurance program (e.g. "hm" for health maintenance organization, "mc" for Medicaid, "wc" for workers compensation). | 3 (Alpha-numeric) |
| Coverage Level Code | A code indicating the level of coverage being provided for the patient, such as "employee only", "family", etc. | 3 (Alpha-numeric) |
| Contracted Service Amount | The contracted amount for the service type code which the provider has agreed to accept. | 12 (Numeric) |
| Remaining Deductible Amount | The remaining amount of the deductible which the insured individual has to meet before the carrier will reimburse the provider. | 12 (Numeric) |

Information such as this may assist a provider in knowing a contracted amount to charge for services under the patient's healthcare plan, and whether to collect from the patient, because the deductible amount has not been met and/or collect any co-pay amounts.

In another implementation, the account associated with a payment processing system can be used to determine eligibility, co-payment, and adjudicated financial responsibility of an insured (e.g., a person responsible for payments to a healthcare provider under an insurance plan of the insurance carrier). The payment processing system may include an issuer such as the issuer processor 26, an acquirer such as acquirer processor 22, a transaction handler such as the transaction processing system, and the insured. See text in the section entitled "*Payment Processing System*" in the later part of this application for a detailed discussion of the payment processing system. Moreover, account associated with the payment processing system can be used to transfer clinical information and concierge services to provide quality healthcare information and services.

Referring to FIG. 4, depicts a table illustrating, for an exemplary model system, activities prior to the rendering of a healthcare related commodity (e.g., a good or service for rendering to a patient deriving healthcare insurance through the insured) to a patient and activities at a point of care terminal. The insured, such as the patient, may receive a portable consumer device such as a flexible spending account, from the payment transaction system. The portable consumer device may be authenticated at this stage. The insured may log on to a secure website to set privacy settings for medical records of the insured, or other persons covered by the insured's insurance plan. The insured may also access the website to gain medical information such as information about a medical condition given symptoms of the medical condition. The insured may also access concierge type services from the payment transaction system including receiving refers for healthcare providers.

Once at a healthcare provider's facility, the insurer may use the account associated with the payment processing system to determine eligibility for the patient, determine the amount of co-payment the insured may be responsible for, determine the insured's monetary responsibility for healthcare related commodities rendered to the patient, and/or transfer basic medical records of the patient each of which may occur in real time. The phrase 'real time' may be understood to mean the duration of time that is needed to derive an amount owed by the insured for goods and/or services rendered to the patient. By way of example, the 'real time period' may be relatively short, such as about thirty seconds or less, of even the time period that the patient is at the facility of the healthcare provider. The reasons for the visit may be entered into the patient's medical records. Alternatively, the determination of the insured's monetary responsibility for healthcare related commodities rendered to the patient may occurs chronologically proximal to the rendering of the healthcare related commodity to the patient.

FIG. 5 depicts a table illustrating, for the exemplary model system of FIG. 4, exemplary activities at a point of care terminal and exemplary activities after the rendering of the healthcare related commodity to the patient. For example, the insured may swipe a bank card having an identifier of the account (e.g., account number) within the payment processing system at a terminal at the Point of Care (POC). A description of a healthcare related commodity for rendering to a patient deriving healthcare insurance through the insured may be uploaded into records maintained at the payment processing system.

For example, a transmission may be formed that is addressed to the acquirer of the healthcare provider. The transmission may include information such as the insured's account number within the payment processing system, the description of a healthcare related commodity for rendering to a patient deriving healthcare insurance through the insured, and a request for a specification of financial responsibility of the insured for the described healthcare related commodity.

The request for the specification of financial responsibility of the insured may be an eligibility request, such as a request for eligibility indication for the patient as to insurance coverage through the insured for the described healthcare related commodity rendering the patient. The eligibility indication may include an indicia signifying that the patient is eligible for insurance coverage through the insured for the described healthcare related commodity; an indicia signifying that the patient is ineligible for insurance coverage through the insured for the described healthcare related commodity; and an indicia signifying that the patient is partially eligible for insurance coverage through the insured for the described said healthcare related commodity for rendering to the patient. For example, a request to determine if a child's flu shot is eligible to be covered by the insurance carrier of the insured that is the father of the child. The indicia may be that the child is eligible for coverage.

The healthcare provider may receive a reply to the request from the addressed payment processing system. For example, the acquirer of the healthcare provider may forward the request to the payment transaction system. The payment transaction system may use an algorithm to convert the identifier of the account within the payment processing system to an insurance account identifier that is associated with both the insured and an insurance carrier. The payment transaction system may form a transmission addressed to an insurance carrier that includes the insurance account identifier, the description of the healthcare related commodity for rendering to the patient deriving healthcare insurance through the insured; and the request for the specification of financial responsibility of the insured for the described said healthcare related commodity (e.g., "how much is the adjudicated monetary responsibility of the insured for prescription medication."). The payment transaction system may receive a reply to the transmission from the addressed insurance carrier including the specification of financial responsibility of the insured for the described said healthcare related commodity (e.g., $15 U.S. co-pay is due). The payment transaction system may form a transmission to the healthcare provider including at least part of the reply, such as a co-pay amount due, the adjudicated claim information based upon contracted rates, the identifier of the account within the payment processing system, the insurance account identifier, or a combination thereof.

The healthcare provider may then bill the patient for the amount of that the insured is responsible for. By way of example, and not by way of limitation, the insured may chose to use the same account associated with the payment processing system. Such a choice can be made to make the payment by swiping the insured's portable consumer device issued to same by an issuer. Thereafter, the information gathered by the swiping of the portable consumer device is submitted as a financial authorization request to the payment processing system. The payment may be for at least a portion of the financial responsibility of the insured for the described healthcare related commodity. For example, the payment may be for a transaction with a healthcare provider of the healthcare related commodity for rendering to the patient. The provider of the healthcare related commodity may communicate the transaction to the acquirer. The acquirer may communicate the transaction to the payment transaction processor (e.g., the transaction handler). The payment transaction processor may communicate the transaction to the issuer and the issuer may communicate the transaction to the insured for payment.

To illustrate, the healthcare provider may be a pharmacy. The insured may swipe the portable consumer device at the POC of the pharmacy. The request may include an identifier for the pharmacy and the identifier of the account associated with the payment processing system. A doctor's prescription for a diagnosed medical condition of the patient may have been previously uploaded into the patient's records maintained at the payment processing system. The reply to the request may include: the identifier for the account associated with the insured, the prescription, and the insured's responsible portion toward the payment for the prescribed medication.

The insured may use the concierge service to complain of bad healthcare related commodities rendered to the patient.

The payment transaction system may also facilitate the transfer of payment from the insurance carrier to the healthcare provider through such systems as the Visa ePay system. The Visa ePay system® is a fully automated, electronic payment delivery system that links financial institutions (e.g., acquirers and issuers), payment originators, billers, and credit counseling agencies such that online bill payments remain electronic from entry to posting.

Referring to FIG. 6, a table illustrating exemplary key components of the exemplary model system of FIG. 4 is depicted. Moreover, referring to FIG. 7, a table illustrating, for the exemplary model system of FIG. 4, corresponding value propositions each of an exemplary third party healthcare information processor role and an exemplary transaction processor role is depicted. Components include advantages such as real-time access to information, greater efficiency in payments, risk management, and access to "quality" services through the concierge services. Roles include a description of what the payment transaction system, such as Visa, may process and a description of what a third party healthcare information processor, such as the Patient Safety Institute (PSI), may process.

Figure 8:
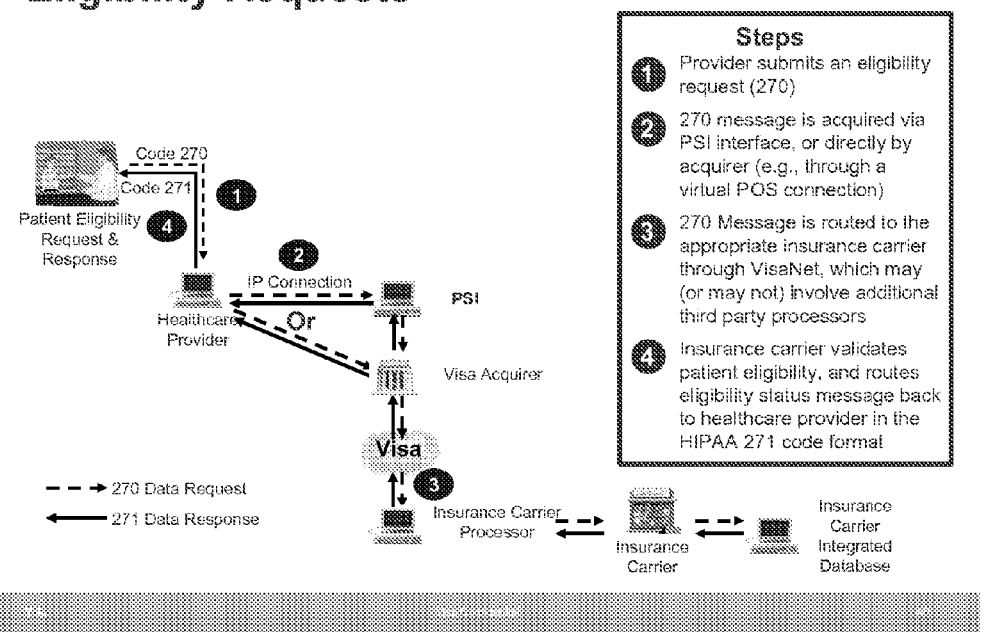
FIG. 8 shows a flowchart illustrating an exemplary process flow, which can be implemented in the exemplary system of FIG. 1, for the determination of an eligibility request for the rendering of a healthcare related commodity to a patient.

Referring to FIG. 8, a flowchart illustrates an exemplary process flow, where the process can be implemented in the exemplary system of FIG. 1, for the determination of an eligibility request for the rendering of a healthcare related commodity to a patient. See *United State's HIPAA*, infra, regarding HIPAA standards.

At FIG. 8 step 1, the provider may submit an eligibility request (HIPAA 270). The eligibility request may contain include information such as an identifier of the insured's account within the payment processing system, the description of a healthcare related commodity rendered to a patient covered by an insurance plan of the insured (e.g., "flu shot" or code 98 denoting "Physician Office Visit"), and specification of financial responsibility of the insured for the described said healthcare related commodity (e.g., "is the patient covered within the insured's insurance plan").

At FIG. 8 step 2, the acquirer may receive the eligibility request directly, such as through a virtual point of service (POS) connection. The virtual POS may be have a split dial connection at the healthcare provider's facility such that one line of the split dial is dedicated to the encrypted transmission of healthcare related data. Alternatively, a third party, such as PSI, may receive the eligibility request from the healthcare provider and forward at least part of the eligibility request to the acquirer.

At FIG. 8 step 3, the eligibility request is routed to the appropriate insurance carrier, for example, through the payment transaction system. Step 3 of FIG. 8 may entail the involvement of additional third party processors to assist with the routing of the eligibility request.

At FIG. 8 step 4, the insurance carrier validates whether the patient is eligible under the insurance plan of the insured to be at least partially covered for the healthcare related commodity rendered to the patient. For example, a child of the insured may be listed under the insured's Humana Health Maintenance Organization (HMO) plan. The child has a rhinoplasty at a hospital. Once the insurance carrier receives the eligibility request from the payment transaction system, the insurance carrier may determine that the child is part of the Humana HMO plan, however, the rhinoplasty was an esthetic operation, the payment of which is not covered by the Humana HMO plan.

Figure 9:
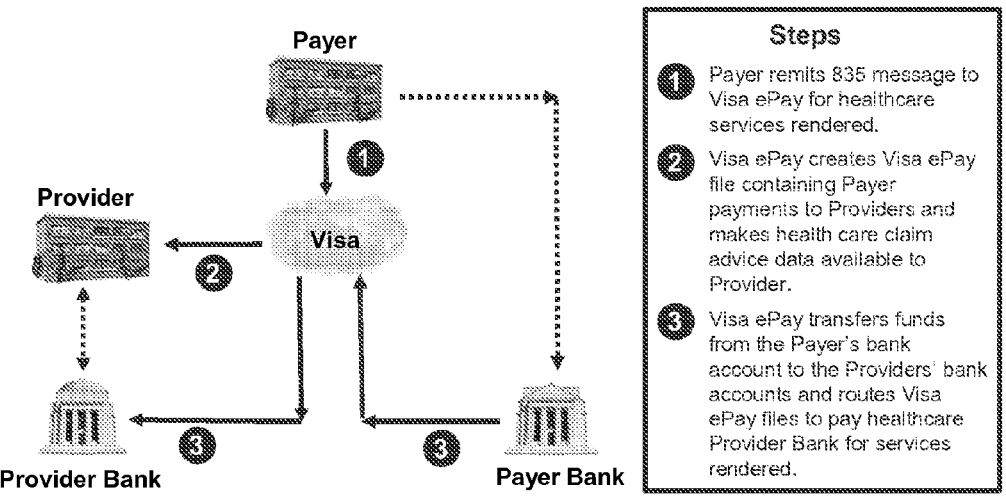
FIG. 9 shows a flowchart illustrating an exemplary process flow, which can be implemented in conjunction with the exemplary process flow of FIG. 8, for an 835 claim payment.

Referring to FIG. 9, a flowchart illustrating an exemplary process flow, which can be implemented in conjunction with the exemplary process flow of FIG. 8, for an 835 claim payment is shown. A payer, such as the insurance carrier, may pay the healthcare provider through an electronic payment delivery system such as the Visa ePay system®.

At FIG. 9 step 2, the payer remits the response to the eligibility request to the electronic payment delivery system for healthcare related commodities rendered. For example, the electronic payment delivery system can create files containing the insurance carrier payments to the healthcare provider and make a 'healthcare claim advise' available to the healthcare provider.

At FIG. 9 step 3, the electronic payment delivery system can transfer funds from an insurance carrier's bank (e.g., insurance carrier's acquirer) account to a healthcare provider's bank (e.g. insurance carrier's acquirer) account and route the created files to pay the healthcare provider's bank for the services rendered.

Figure 10:
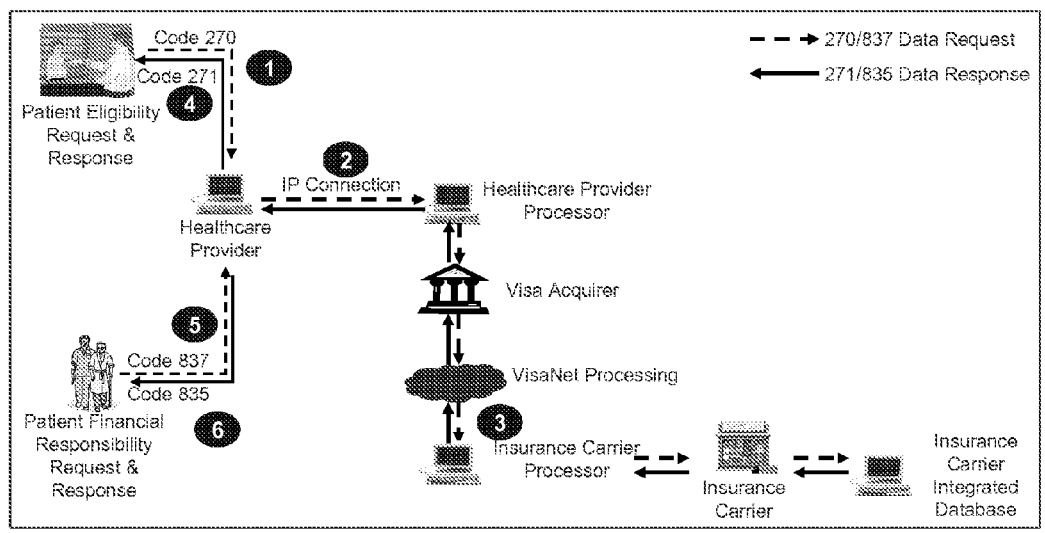
FIG. 10 shows a flowchart illustrating an exemplary data and process flow, which can be implemented in the exemplary system of FIG. 4, for the determination of an eligibility request for the rendering of a healthcare related commodity by a healthcare provider to a patient associated with an insured of a insurance carrier.

Referring to FIG. 10, a flowchart illustrating an exemplary data and process flow, which can be implemented in the exemplary system of FIG. 4, for the determination of an eligibility request for the rendering of a healthcare related commodity by a healthcare provider to a patient associated with an insured of an insurance carrier is shown. The communications may be in the form of electronic transmissions. The electronic transmission may include Electronic Protected Health Information (EPHI), which is may be governed by industry standards such as the American Health Insurance Portability and Accountability Act of 1996 (HIPAA). The transmissions may occur via the payment processing system, such as a credit card payment processing system. The payment of the patient financial responsibility may also occur via the payment processing system such as through the transmission of the transaction data (e.g., account number, account holder name, transaction cost, tax).

A terminal at the POS, may be used to send and receive the electronic transmissions. The terminal at the POS may have a split dial such that portions of the transmission can be sent to different addresses. The transmissions including the patient eligibility data, the patient financial responsibility data, and/or the transaction data for the payment of the patient financial responsibility may occur in real time such that the patient is physically present at the health care provider's facility as the transmissions occur (e.g, a period less than one hour) or a waiting period equivalent to the time the patient entered a facility of the healthcare provider and the time the healthcare provider renders the healthcare related commodity to the patient.

The patient may use a portable consumer device to provide patient identification information or other information to the POS terminal. For example, the patient may have a payment (credit, debit or prepaid/stored value) or healthcare card with a magnetic stripe that has information about an account such as a credit card, a debit card, a saving account, a checking account, a stored value card account, a gift card account, a money market fund, a trust account, a Flexible Spending Account, a Managed Savings Account, a Dependent Care Reimbursement Account, a Health Care Reimbursement Account, Health Reimbursement Account, and a combination thereof. The magnetic striped card can be swiped through a card reader in the provider's POS terminal. The patient information may then be sent to the insurance carrier via the payment processing system.

The electronic transmissions may include at least part of the patient information, such as the information obtained from the portable consumer device. For example, the transmission including patient financial responsibility data may have the patient name and patient insurance account number. Alternatively, or in combination, the patient information may be encrypted, hashed, a code may be used to determine other patient information such as by using a "look-up" table. For example patient information, such as a patient's credit card account number, may be included in the patient financial responsibility data transmission. The recipient of the transmission, or a third party, may utilize the patient's credit card account number to determine the patient's health insurance account number given access to a database that links the patient's credit card account number to the patient's health insurance account number.

At FIG. 10 step 1, upon patient check-in and authentication, the healthcare provider submits an eligibility request to the patient's insurance carrier. This request may be in the HIPAA 270 code format, and may include unique identifiers of the individual being treated, the health care provider, the health plan, and the employer, for example.

At FIG. 10 step 2, the healthcare provider can capture a 270 message in a virtual POS terminal, which may be in-house or hosted by an external processor, and route this message to its Acquirer.

At FIG. 10 step 3, 270 Message can be routed to the appropriate insurance carrier through the payment processing system (e.g., VisaNet), which may (or may not) involve additional third party processors.

At FIG. 10 step 4, the Insurance carrier can validate patient eligibility, and route eligibility status message back to healthcare provider in the HIPAA 271 code format, for example.

At FIG. 10 step 5, after treatment, healthcare provider can submit claims request to insurance carrier in the HIPAA 837 message format, for example.

At FIG. 10 step 6, the transaction can follow the same route as the 270 message format. A message, such as a '835 message', can be sent back to the healthcare provider confirming the patient responsibility. For example, when the insurance carrier has an auto adjudication system, and the submitted claim can in fact be auto adjudicated, the 835 message can be transmitted before the patient leaves the health care provider's office and the provider can bill and collect from the patient; alternatively, or in combination, for example if the claim cannot be auto adjudicated, the health care provider may collect the co-payment for the service rendered.

United State's HIPAA

The American Health Insurance Portability and Accountability Act of 1996 (HIPAA) defines rules to ensure that all medical records, medical billing, and patient accounts meet certain consistent standards with regard to documentation, handling and privacy. Any healthcare provider that electronically stores, processes or transmits medical records, medical claims, remittances, or certifications must comply with HIPAA regulations. Fines for HIPAA non-compliance are up to $25,000 for multiple violations, $250,000 or imprisonment up to 10 years for knowing abuse or misuse of individually-identifiable health information.

HIPAA Privacy Rule. The HIPAA Privacy Rule mandates the protection and privacy of all health information. This rule specifically defines the authorized uses and disclosures of "individually-identifiable" health information.

HIPAA Security Rule. The HIPAA Security Rule mandates the security of electronic medical records (EMR). Unlike the Privacy Rule, which provides broader protection for all formats that health information make take, such as print or electronic information, the Security Rule addresses the technical aspects of protecting electronic health information.

Figure 11:
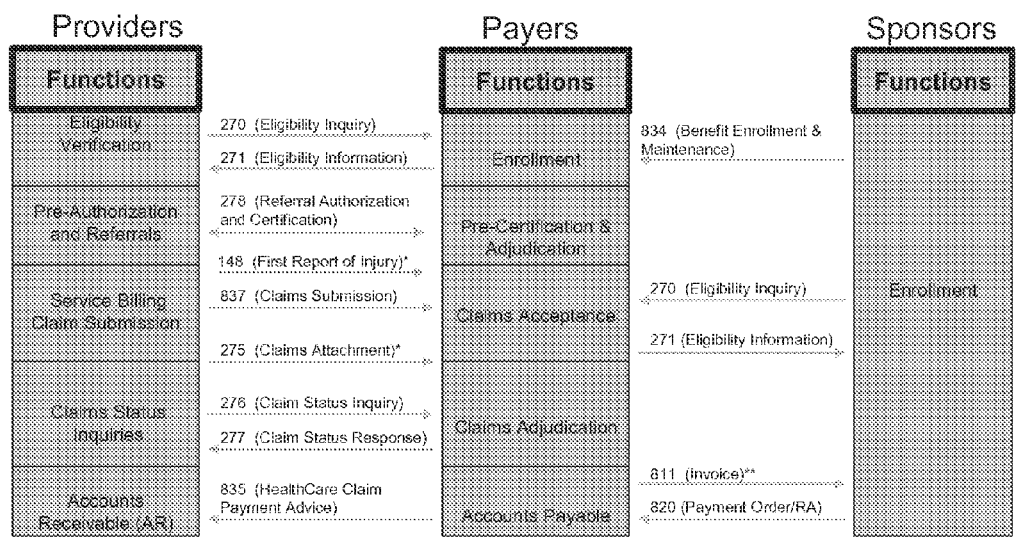
FIG. 11 shows a block diagram depicting an exemplary data and process flow, which can be implemented in the exemplary data and process flow of FIG. 11, and illustrating interrelationships between a healthcare provider, an insurance carrier, and a sponsoring organization.

HIPAA Transactions and Code Set Rule. The HIPAA Transaction and Code Set Standard addresses the use of pre-defined transaction standards and code sets for communications and transactions in the health-care industry. The respective HIPAA transaction flows are illustrated in FIG. 11. Referring to FIG. 11, shows a block diagram depicting an exemplary data and process flow, which can be implemented in the exemplary data and process flow of FIG. 10, and illustrating interrelationships between a healthcare provider, an insurance carrier, and a sponsoring organization is shown.

HIPAA 270/271 and 837/835 Message Fields

HIPAA 270/271 Message Fields

The Health Care Eligibility/Coverage/Benefit transactions are designed so that healthcare providers can determine whether an Information Source organization (payer, employer, Health Maintenance Organization "HMO", etc) has a particular subscriber and/or dependent(s). The data available through these transaction sets can be used to verify an individual's eligibility or benefits:

Health Care Eligibility/Coverage/Benefit Inquiry (270) transmits data from a submitter (information receiver) to an information source organization;

Health Care Eligibility/Coverage/Benefit Information (271) transmits data from an information source organization to an information receiver.

The following is an example of the overall structure of the 270 Transaction Set:

| | |
|---|---|
| Eligibility or Coverage/Benefit Information | Eligibility/Coverage/Benefit Information |
| Source | Source identifies the payer, maintainer, or |
| Subscriber | source of the eligibility or benefit information |
|     Dependent | Eligibility/Coverage/Benefit Information |
|         Eligibility or Benefit Inquiry (Question) | Receiver identifies the provider who |
| Subscriber | receives the eligibility or benefit information |
|     Dependent | Subscriber identifies the employee or |
|         Eligibility or benefit Inquiry (Question) | group member, or patient who is covered |
|         Eligibility or Benefit Inquiry (Question) | for insurance and to whom, or on behalf of |
| | whom, the insurer agrees to pay benefits |
| | Dependent identifies the person who is |
| | affiliated with the subscriber (spouse, child, etc.) |

The corresponding 271 response may follow the same structure displayed above, with the Eligibility or Benefit Information replacing the Eligibility or Benefit Inquiry.

HIPAA 837/835 Message Fields

The HIPAA Health Care Claim: Professional Transaction (837) is used for submitting professional claims and/or encounters to payers for payment. The transaction originates with the health care provider or the health care provider's designated agent or with payers in an encounter reporting situation. Information is sent to permit the destination payer to begin to adjudicate the claim. The Health Care Claim: Professional Transaction (837) coordinates with a variety of other transactions including, but not limited to Remittance Advice (835). It was designed specifically to address issues concerning the handling of coordination of benefits (COB) in a totally EDI environment, particularly COB transactions involving Medicare and Medicaid. One 837 can contain many claims from different providers all sent to one payer.

The Health Care Claim Payment/Advice (835) transaction set is designed for the payment of claims and transfer of remittance information. It can be used to make the payment, send an Explanation of Benefits (EOB) remittance advice, or both. As a remittance advice, the 835 provides detailed payment information including, if applicable, the reasons why the total original charges were not paid in full. Note that insurance carriers can pay claims and send remittance advice in different ways (i.e., together or separately) and through different channels (i.e., directly to the provider or through financial institutions).

Payment Processing System

Figure 12:
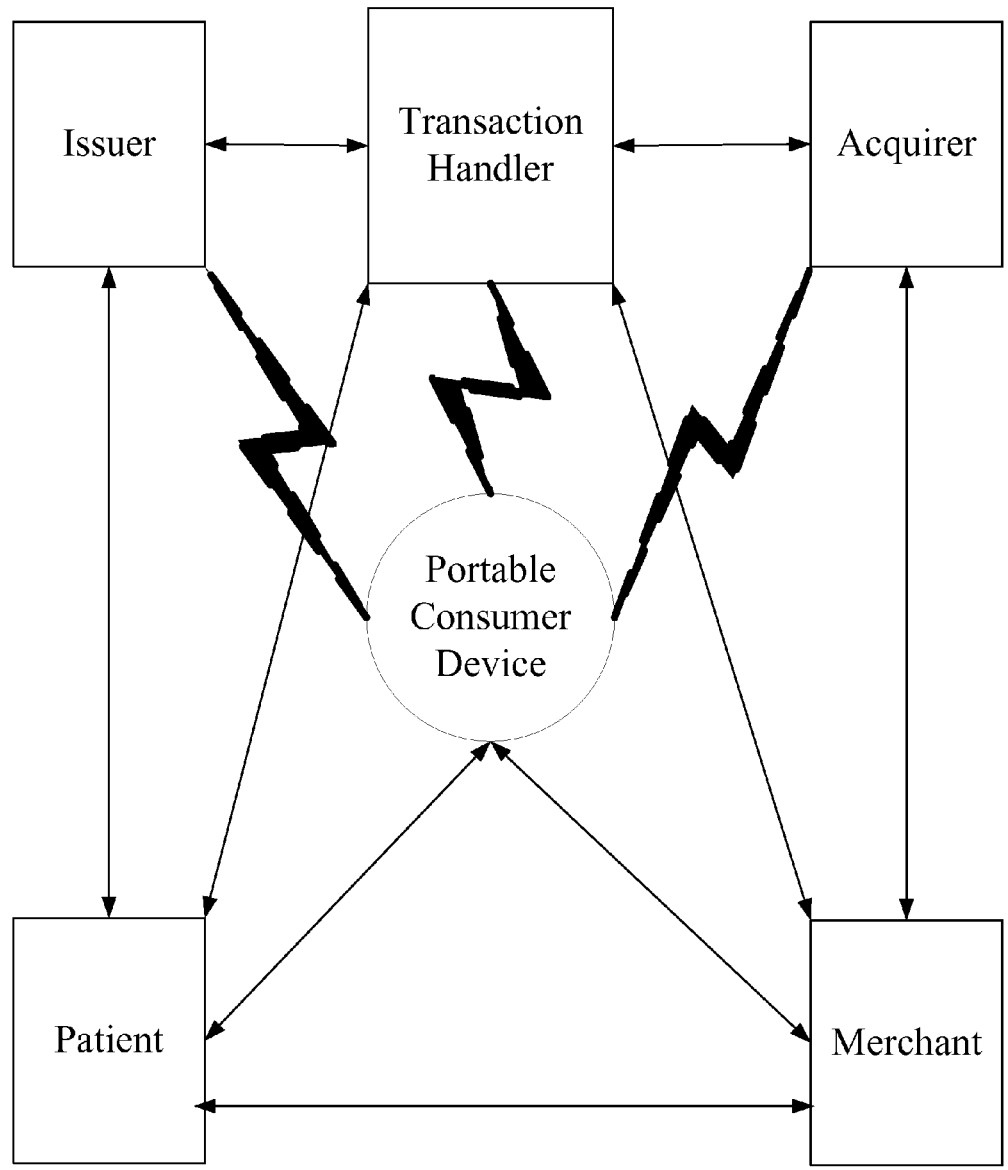
FIG. 12 shows a block diagram of an exemplary payment system in which the exemplary system depicted in FIG. 1 can be implemented.

As background information for the foregoing description, as will be readily understood by persons of ordinary skill in the art, a transaction such as a payment transaction, can include participation from different entities that are a component of the payment processing system as illustrated in FIG. 12. The payment processing system may includes an issuer, a transaction handler, such as a credit card company, an acquirer, a merchant, such as a health care provider, or a consumer such as an insured having insurance coverage through which a patient receive healthcare benefits. The acquirer and the issuer can communicate through the transaction handler. The merchant may utilize at least one POS terminal that can communicate with the acquirer, the transaction handler, or the issuer. Thus, the POS terminal is in operative communication with the payment processing system.

Typically, a transaction begins with the consumer presenting a portable consumer device to the merchant to initiate an exchange for a good or service. The portable consumer device may include a payment card, a gift card, a smartcard, a smart media, a payroll card, a health care card, a wrist band, a machine readable medium containing account information, a keychain device such as the SPEEDPASS commercially available from ExxonMobil Corporation or a supermarket discount card, a cellular phone, personal digital assistant, a pager, a security card, an access card, a wireless terminal, or a transponder. The portable consumer device may include a volatile or non-volatile memory to store information such as the account number or an account holder's name.

The Merchant may use the POS terminal to obtain account information, such as an account number, from the portable consumer device. The portable consumer device may interface with the POS terminal using a mechanism including any suitable electrical, magnetic, or optical interfacing system such as a contactless system using radio frequency or magnetic field recognition system or contact system such as a magnetic stripe reader. The POS terminal sends a transaction authorization request to the issuer of the portable consumer device. Alternatively, or in combination, the portable consumer device may communicate with the issuer, the transaction handler, or the acquirer.

The issuer may authorize the transaction using the transaction handler. The transaction handler may also clear the transaction. Authorization includes the issuer, or the transaction handler on behalf of the issuer, authorizing the transaction in connection with the issuer instructions such as through the use of business rules. The business rules could include instructions or guidelines from the transaction handler, the consumer, merchant, the acquirer, the issuer, a financial institution, or combinations thereof. The transaction handler may maintain a log or history of authorized transactions. Once approved, merchant will record the authorization, allowing the consumer to receive the good or service.

Merchant may, at discrete periods, such as the end of the day, submit a list of authorized transactions to the acquirer or other components of the payment processing system. The transaction handler may compare the submitted authorized transaction list with its own log of authorized transactions. If a match is found, the transaction handler may route authorization transaction amount requests from the corresponding acquirer to the corresponding issuer involved in each transaction. Once the acquirer receives the payment of the authorized transaction amount from the issuer, it can forward the payment to merchant less any transaction costs, such as fees. If the transaction involves a debit or pre-paid card, the acquirer may choose not to wait for the initial payment prior to paying the merchant.

There may be intermittent steps in the foregoing process, some of which may occur simultaneously. For example, the acquirer can initiate the clearing and settling process, which can result in payment to the acquirer for the amount of the transaction. The acquirer may request from the transaction handler that the transaction be cleared and settled. Clearing includes the exchange of financial information between the issuer and the acquirer and settlement includes the exchange of funds. The transaction handler can provide services in connection with settlement of the transaction. The settlement of a transaction includes depositing an amount of the transaction settlement from a settlement house, such as a settlement bank, which the transaction handler typically chooses, into a clearinghouse, such as a clearing bank, that the acquirer typically chooses. The issuer deposits the same from a clearinghouse, such as a clearing bank, which the issuer typically chooses into the settlement house. Thus, a typical transaction involves various entities to request, authorize, and fulfill processing the transaction.

Implementations may be embodied as one or more of a method, a system, a device, and a computer program; where each method, system, device, and a computer program can include software and/or hardware components. Implementations are described using block diagrams and flowcharts to illustrate means for performing the described functions of the method, system, device, and computer program. The computer program can include a computer-readable storage medium having computer-readable program code means embodied in the storage medium. The system can include a host system including a processor for processing data, a memory in communication with the processor for storing the data, an input digitizer in communication with the memory and the processor for inputting the data into the memory; and an application program stored in the memory and accessible by the processor for directing processing of the data by the processor. The application program can be configured to perform a method. The system can include various integrated circuit components, such as microprocessors, controllers, memory elements, processing elements, logic elements, and look-up tables.

The steps of a method, process, or algorithm described in connection with the implementations disclosed herein may be embodied directly in hardware, in a software module executed by a processor, or in a combination of the two. The various steps or acts in a method or process may be performed in the order shown or may be performed in another order. Additionally, one or more process steps may be omitted or one or more process steps may be added to the processes. An additional step, block, or action may be added in the beginning, end, or intervening existing elements of such processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A processor-implemented method comprising:
receiving account information associated with an insured upon instantiation of a consumer portable device at a healthcare provider financial payment acceptance terminal;
forming, via a processor, at the healthcare provider financial payment acceptance terminal a healthcare coverage eligibility determination request including:
the account information associated with the insured;
a description of a healthcare related commodity for a patient deriving healthcare insurance through the insured; and
a request for a healthcare patient financial responsibility specification for said healthcare related commodity;
transmitting the healthcare coverage eligibility determination request to a payment processing system,
wherein the payment processing system is configured to process card-based financial payment transactions; and
receiving, in response to the healthcare coverage eligibility determination request the requested healthcare patient financial responsibility specification from the payment processing system.

2. The method as defined in claim 1, wherein the the payment processing system corresponds to an entity selected from the group consisting of:
a payment transaction system;
a transaction handler;
an acquirer;
an issuer; and
a combination thereof.

3. The method as defined in claim 1, wherein the insured is the patient.

4. The method as defined in claim 1, wherein the healthcare related commodity is selected from a group consisting of:
a healthcare related good;
a healthcare related service; and
a combination thereof.

5. The method as defined in claim 1, wherein the healthcare related commodity is provided by an entity selected from the group consisting of:
a provider of a healthcare service for compensation by the healthcare insurance of the insured;
a provider of healthcare goods for compensation by the healthcare insurance of the insured; and
a combination thereof.

6. The method as defined in claim 1, wherein the account corresponds to a payment method selected from the group consisting of a credit card, a debit card, a saving account, a checking account, a stored value card account, a gift card account, a money market fund, a trust account, a Flexible Spending Account, a Managed Savings Account, a Dependent Care Reimbursement Account, a Health Care Reimbursement Account, Health Reimbursement Account, and a combination thereof.

7. The method as defined in claim 1, wherein the account information includes an account number for the account.

8. The method as defined in claim 1, the specification of financial responsibility of the insured for the healthcare related commodity includes information selected from the group consisting of:
a healthcare provider identifier for a healthcare provider that has provided the healthcare related commodity to the patient;
a code associated with the healthcare related commodity;
a contracted amount due for the healthcare related commodity;
a textual message conveying the nature of the healthcare related commodity; and
a combination thereof.

9. The method as defined in claim 1, wherein the requested specification of financial responsibility is selected from the group consisting of:
an amount due from the insured for the healthcare related commodity the patient;
an expense of the healthcare related commodity;
a deductible initial portion of a covered expense of the healthcare related commodity, said covered expense being payable by the insured before the insurance thereof pays the residual part of the covered expense;
a remaining portion of the deductible initial portion;
a specification of a percentage of the deductible initial portion;
a remaining value of insurance available to the patient through the insured;
information about insurance available to the patient through the insured; and
a combination thereof.

10. The method as defined in claim 1, wherein the response is received less than about one (1) hour after transmitting the eligibility determination request.

11. The method as defined in claim 1, wherein the request is encrypted.

12. The method as defined in claim 1, wherein the specification of financial responsibility includes an eligibility indication for the patient as to insurance coverage through the insured for the healthcare related commodity.

13. The method as defined in claim 1, wherein the specification of financial responsibility includes an eligibility indication for the patient as to insurance coverage through the insured for the healthcare related commodity, wherein the eligibility indication is selected from the group consisting of:
indicia signifying that the patient is eligible for insurance coverage through the insured for the healthcare related commodity;
indicia signifying that the patient is ineligible for insurance coverage through the insured for the healthcare related commodity; and
indicia signifying that the patient is partially eligible for insurance coverage through the insured for the healthcare related commodity.

14. The method as defined in claim 1, further comprising:
making a payment utilizing the account associated with the insured wherein the payment is at least a portion of the financial responsibility of the insured for the healthcare related commodity.

15. The method as defined in claim 14, wherein:
the account is issued by an issuer;
the payment is for a transaction with a provider of the healthcare related commodity;
the provider of the healthcare related commodity communicates the transaction to an acquirer;
the acquirer communicates the transaction to a transaction handler;
the transaction handler communicates the transaction to the issuer; and
the issuer communicates the transaction to the insured for payment.

16. A processor-implemented method, comprising:
receiving, via a payment processing system, a healthcare coverage eligibility determination request formed at a healthcare provider financial payment acceptance terminal from a healthcare provider including:
an identifier of an account associated with an insured;

a description of a healthcare related commodity for a patient-deriving healthcare insurance-through the insured; and a request for a healthcare patient financial responsibility specification for the healthcare related commodity;

wherein the payment processing system is configured to process card-based financial payment transactions;

determining, via a processor, an insurance account identifier based at least in part on the identifier of the account, wherein the insurance account identifier is associated with both the insured and its insurance carrier;

transmitting the healthcare coverage eligibility determination request along with the insurance account identifier to the insurance carrier;

receiving a response to the transmitted healthcare coverage eligibility determination request from the insurance carrier, the response including the healthcare patient financial responsibility specification; and transmitting at least a portion of the response to the health care provider.

17. The method as defined in claim 16, wherein the determining further comprises using an algorithm to convert the identifier of the account to the insurance account identifier associated with the insured.

18. The method as defined in claim 16, wherein the specification of financial responsibility includes an eligibility indication for the patient as to insurance coverage through the insured for the healthcare related commodity.

19. The method as defined in claim 18, wherein the eligibility indication is selected from the group consisting of:

indicia signifying that the patient is eligible for insurance coverage through the insured for the healthcare related commodity;

indicia signifying that the patient is ineligible for insurance coverage through the insured for the healthcare related commodity; and indicia signifying that the patient is partially eligible for insurance coverage through the insured for the healthcare related commodity.

20. A processor-implemented method, comprising:

receiving account information associated with an insured upon instantiation of a consumer portable device at a healthcare provider financial payment acceptance terminal;

forming, via a processor, at a healthcare provider terminal a healthcare coverage eligibility determination request including:

the account information associated with the insured;

a description of a healthcare related commodity for a patient covered by healthcare insurance through the insured; and a request for a healthcare patient financial responsibility specification for the healthcare related commodity;

transmitting the healthcare coverage eligibility determination request to a payment processing system, wherein the payment processing system is configured to process card-based financial payment transactions; and receiving, a response from the payment processing system the response including the requested healthcare patient financial responsibility specification; and determining based on the received response from the payment processing system an amount owed by the insured for the healthcare related commodity.

21. The method as defined in claim 20, further comprising:

obtaining at least a portion of the determined amount owed by utilizing the account.

* * * * *